(12) United States Patent
Yeh et al.

(10) Patent No.: US 11,364,594 B2
(45) Date of Patent: Jun. 21, 2022

(54) CLAMPING DEVICE

(71) Applicant: PEGATRON CORPORATION, Taipei (TW)

(72) Inventors: Chun-Liang Yeh, Taipei (TW); Kuo-Jung Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 134 days.

(21) Appl. No.: 16/877,654

(22) Filed: May 19, 2020

(65) Prior Publication Data

US 2020/0406427 A1 Dec. 31, 2020

(30) Foreign Application Priority Data

Jun. 27, 2019 (TW) ................. 108122713

(51) Int. Cl.
| | |
|---|---|
| *B25B 5/10* | (2006.01) |
| *B25B 5/04* | (2006.01) |
| *B25B 5/14* | (2006.01) |
| *B25B 5/16* | (2006.01) |

(52) U.S. Cl.
CPC ................ *B25B 5/108* (2013.01); *B25B 5/04* (2013.01); *B25B 5/14* (2013.01); *B25B 5/163* (2013.01)

(58) Field of Classification Search
CPC .. B25B 5/108; B25B 5/04; B25B 5/14; B25B 5/163; B25B 5/06; B25B 5/147
USPC .......................................... 269/91; 24/132 R
See application file for complete search history.

(56) References Cited

U.S. PATENT DOCUMENTS

| | | | | |
|---|---|---|---|---|
| 2,882,574 | A | * | 4/1959 | Shumate ................. B25B 5/147 24/132 R |
| 6,152,435 | A | * | 11/2000 | Snell ........................ B25B 1/20 269/268 |
| 2013/0306543 | A1 | * | 11/2013 | Beisser ................... B25B 5/163 210/321.6 |

FOREIGN PATENT DOCUMENTS

| | | |
|---|---|---|
| CN | 206268617 U | 6/2017 |
| CN | 207090797 U | 3/2018 |
| CN | 108080866 A | 5/2018 |
| CN | 208061825 U | 11/2018 |
| CN | 208284652 U | 12/2018 |
| CN | 109909880 A | 6/2019 |
| KR | 2011-0093500 A | 8/2011 |

* cited by examiner

*Primary Examiner* — Seahee Hong
(74) *Attorney, Agent, or Firm* — McClure, Qualey & Rodack, LLP

(57) ABSTRACT

A clamping device includes a first, a second clamping member, a first, a second connecting rod, and an elastic member. The first clamping member includes a first side and a second side opposite to each other. The second clamping member includes a third side and a fourth side opposite to each other. The first connecting rod is pivotally disposed between the first side and the third side. The second connecting rod is pivotally disposed between the second side and the fourth side. The elastic member is connected between the third side and the first connecting rod. The elastic member provides a restoring force to make the first connecting rod rotate relative to the second clamping member, to drive the second connecting rod and the first clamping member to rotate, so that a distance between the first and the second clamping member is shortened to clamp an object.

9 Claims, 5 Drawing Sheets

CLAMPING DEVICE

CROSS-REFERENCE TO RELATED APPLICATION

This application claims the priority benefit of Taiwan application serial no. 108122713, filed on Jun. 27, 2019. The entirety of the above-mentioned patent application is hereby incorporated by reference herein and made a part of this specification.

BACKGROUND

Technical Field

The present disclosure relates to a clamping device which may be used to quickly assemble to an object for clamping and fixation.

Related Art

When a sensor or another object needs to be clamped onto an object, generally a clamp is used for clamping, for ease of quick assembling and disassembling. In the existing design, two clamp bodies of a clamp are generally bonded through a bearing, and a clamping force is obtained through a restoring characteristic of a torsion spring or an elastic piece. For a situation in which a relatively great attachment force is required, usually screws are used for strengthening the attachment. For example, two clamping pieces are formed at a junction with an object to clamp an object to be clamped, and then four corners are tightly locked by screws, so that the two clamping pieces can stabilize the clamped object under the function of lock screws at four corners.

However, in the foregoing manner, an advantage of using elastic pieces for attachment is that quick clamping can be implemented, but disadvantages are that the clamping force is relatively small and the clamping force is relatively uneven. The manner of using screws for attachment is the opposite, to evenly spread the clamping force, mostly four screws are used for attachment. Therefore, an advantage of this manner is that the clamping force is relatively great, and an object can be indeed tightly clamped. However, a disadvantage lies in that, it is quite troublesome when an object is tightly locked because clamping and disassembling cannot be completed quickly.

SUMMARY

To resolve the foregoing problem and obtain a clamping device that can implement quick clamping and disassembling and have an enough clamping force, the present disclosure provides a clamping device in an embodiment. The clamping device includes a first clamping member, a second clamping member, a first connecting rod, a second connecting rod, and an elastic member. The first clamping member includes a first side and a second side, and the first side and the second side are located on two opposite sides. The second clamping member includes a third side and a fourth side, and the third side and the fourth side are located on two opposite sides. One end of the first connecting rod is pivotally disposed on the first side, and the other end is pivotally disposed on the third side. One end of the second connecting rod is pivotally disposed on the second side, and the other end is pivotally disposed on the fourth side. One end of the elastic member is connected to the third side, and the other end is connected to the first connecting rod. The elastic member provides a restoring force to make the first connecting rod rotate relative to the second clamping member, to drive the second connecting rod and the first clamping member to rotate, so that a distance between the first clamping member and the second clamping member is shortened to clamp an object.

In this way, when the clamping device is used to sleeve onto an object and clamp the object, a force may be applied on the first clamping member and the second clamping member, to make the first clamping member and the second clamping member away from each other relatively, so that the clamping device sleeve onto the object. Then the force applied on the first clamping member and the second clamping member is stopped. In this case, the restoring force of the elastic member may be provided to the first connecting rod and the second clamping member, to make the first connecting rod rotate, by using the pivot junction as an axis, relative to the second clamping member to drive the second connecting rod and the first clamping member to rotate, so that the distance between the first clamping member and the second clamping member is shortened to clamp the object.

In this way, the clamping device may be mounted and sleeved onto a required position only by pulling open the clamping device outward, and after the force applied on the clamping device is stopped, the clamping device may automatically clamp the object. This is very convenient and quick in assembling. In addition, if different clamping forces are required, adjustments may also be performed by changing an elastic member with a different spring coefficient. Besides, by respectively disposing connecting rods on two sides of the first clamping member and the second clamping member, the two sides may respectively provide clamping functions, to make the clamping force evenly applied on the object and stabilize the clamping.

The detailed features and advantages of the present disclosure are described below in detail in the following embodiments, and the content of the detailed description is sufficient for a person skilled in the art to understand the technical content of the present disclosure and to implement the present disclosure accordingly. According to the content of the specification, the claims, and the drawings, a person skilled in the art can easily understand the relevant objectives and advantages of the present disclosure.

DETAILED DESCRIPTION

Figure 1:
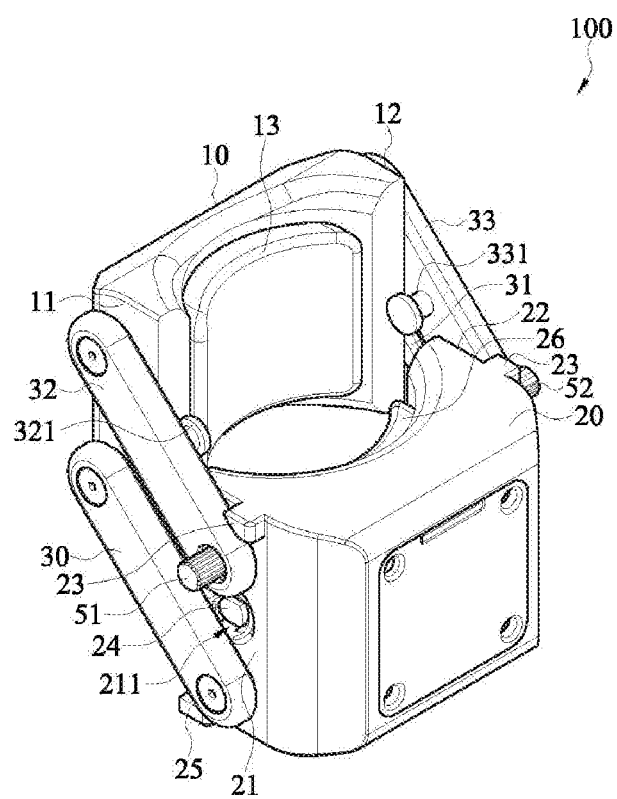
FIG. 1 is a three-dimensional view of a clamping device according to an embodiment of the present disclosure.
Figure 2:
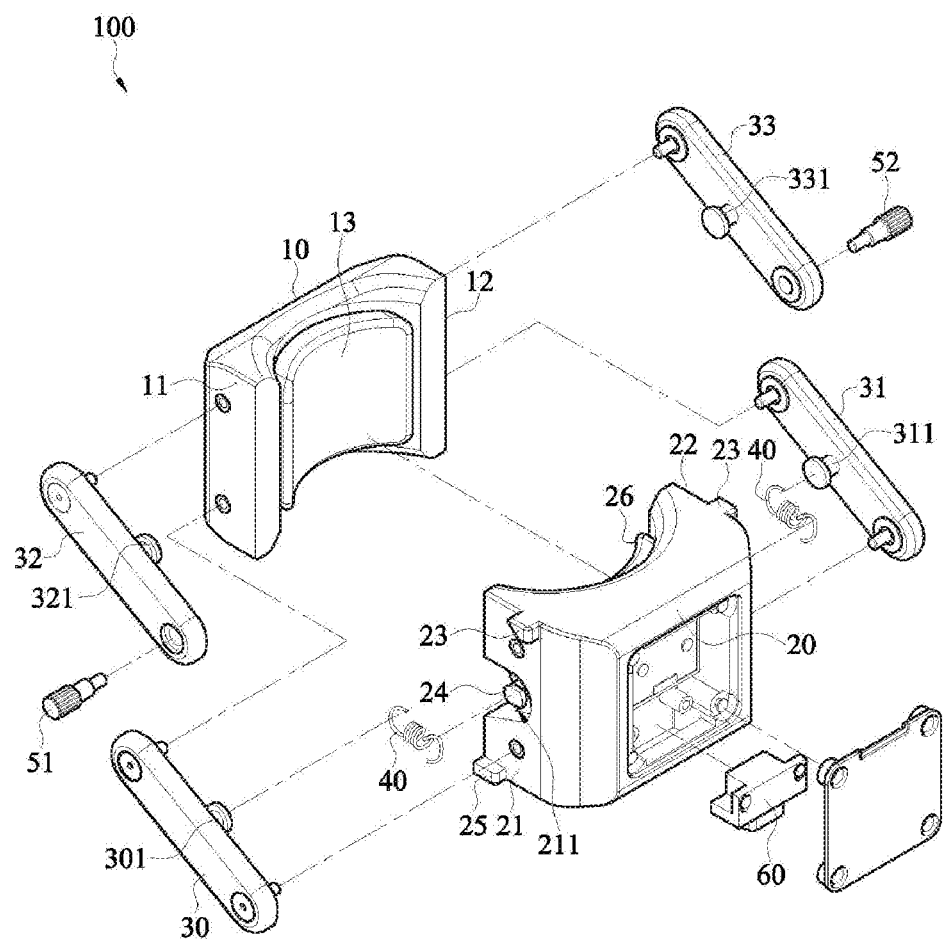
FIG. 2 is an exploded view of the clamping device according to an embodiment of the present disclosure.
Figure 3:
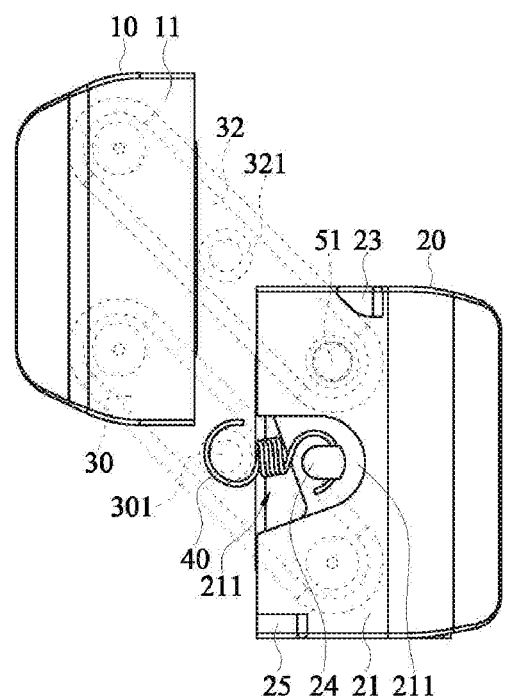
FIG. 3 is a perspective view of a side part of the clamping device according to an embodiment of the present disclosure.

Referring to FIG. 1 and FIG. 2 first, FIG. 1 is a three-dimensional view of a clamping device according to an embodiment of the present disclosure, FIG. 2 is an exploded view of the clamping device according to an embodiment of the present disclosure, and FIG. 3 is a perspective view of a side part of the clamping device according to an embodiment of the present disclosure. A clamping device 100 in this embodiment includes a first clamping member 10, a second clamping member 20, a first connecting rod 30, a second connecting rod 31, a third connecting rod 32, a fourth connecting rod 33, and an elastic member 40. In other implementation aspects, it is also allowed that only the first connecting rod 30 and the second connecting rod 31 are disposed, and the third connecting rod 32 and the fourth connecting rod 33 are omitted. A clamping effect may also be achieved in this way, and details are described below.

As can be seen from FIG. 1 and FIG. 2, the first clamping member 10 includes a first side 11 and a second side 12, and the first side 11 and the second side 12 are located on two opposite sides. The second clamping member 20 includes a third side 21 and a fourth side 22, and the third side 21 and the fourth side 22 are located on two opposite sides. One end of the first connecting rod 30 is pivotally disposed on the first side 11, and another end is pivotally disposed on the third side 21. One end of the second connecting rod 31 is pivotally disposed on the second side 12, and another end is pivotally disposed on the fourth side 22. One end of the third connecting rod 32 is pivotally disposed on the first side 11, and another end is pivotally disposed on the third side 21. One end of the fourth connecting rod 33 is pivotally disposed on the second side 12, and another end is pivotally disposed on the fourth side 22.

As can be seen in FIG. 1, after the assembling is completed, the first connecting rod 30 and the third connecting rod 32 disposed in parallel in a vertical direction are assembled on one side of the first side 11 and one side of the third side 21, and the second connecting rod 31 and the fourth connecting rod 33 disposed in parallel in a vertical direction are assembled on one side of the second side 12 and one side of the fourth side 22. When the first clamping member 10 and the second clamping member 20 move relatively to be close to or away from each other, a rotation shaft of the pivot junction of each connecting rod may rotate clockwise or counterclockwise. To strengthen the stability when the first clamping member 10 and the second clamping member 20 moves relatively, in this embodiment, four connecting rods are used as an example for description. As described above, it is also allowed that only one connecting rod is respectively disposed on two sides, and a same function may also be achieved.

One end of the elastic member 40 is connected to the third side 21, and the another end is connected to the first connecting rod 30. In an initial state when no additional force is applied on the clamping device 100, as shown in FIG. 3, under the elastic tension of the elastic member 40, the first clamping member 10 and the second clamping member 20 may be in a misalignment state in a vertical direction, so that the two ends of the elastic member 40 are closest to each other. In this case, the first connecting rod 30 may be driven to rotate clockwise, to make a position to which the elastic member 40 is connected on the first connecting rod 30 be close to the second clamping member 20 as much as possible. In this case, there is a minimum distance between the first clamping member 10 and the second clamping member 20.

Figure 4:
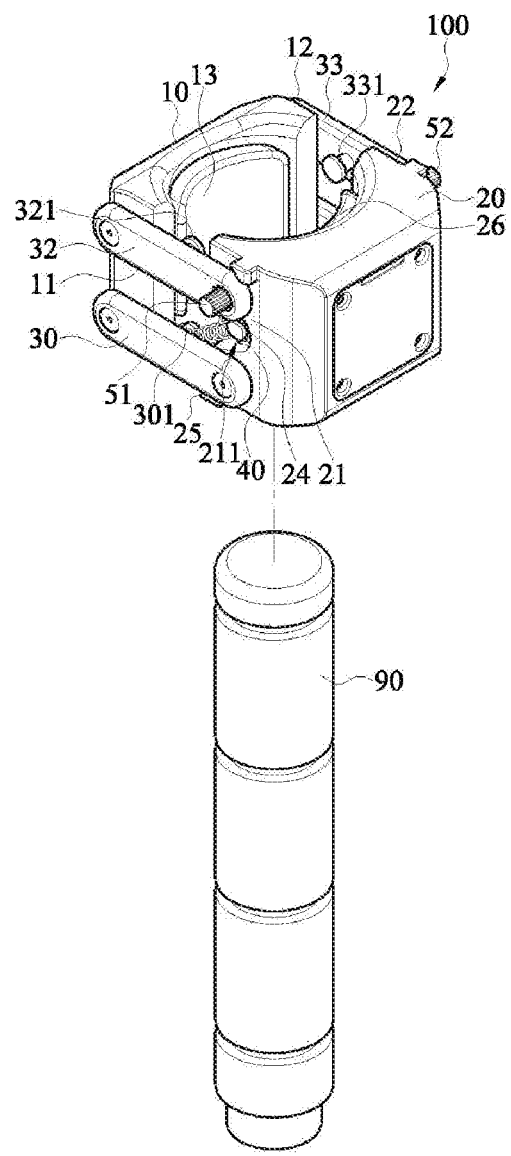
FIG. 4 is a schematic assembly view (1) of the clamping device according to an embodiment of the present disclosure.
Figure 5:
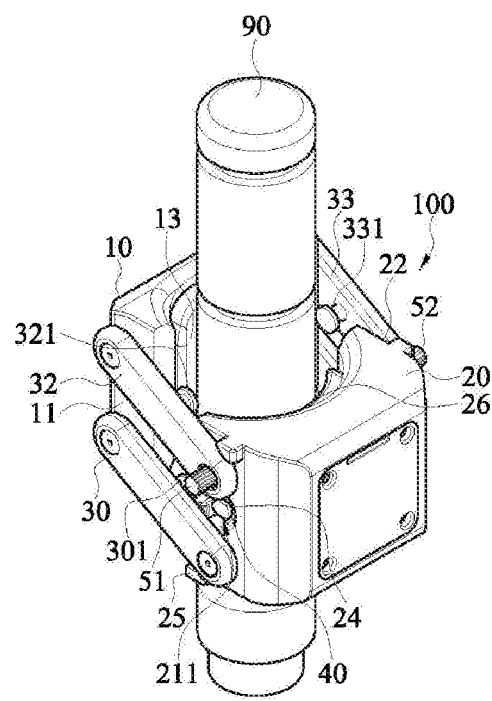
FIG. 5 is a schematic assembly view (2) of the clamping device according to an embodiment of the present disclosure.

Then, referring to FIG. 4 and FIG. 5, FIG. 4 is a schematic assembled view (1) of the clamping device according to an embodiment of the present disclosure, and FIG. 5 is a schematic assembled view (2) of the clamping device according to an embodiment of the present disclosure. An operating principle of the clamping device is first described by using FIG. 4 and FIG. 5. When the clamping device 100 needs to be assembled to clamp an object 90, a force is first applied on the first clamping member 10 and the second clamping member 20, to make the first clamping member 10 and the second clamping member 20 be outward far away from each other. In this case, from the viewing angle shown in FIG. 1, the first connecting rod 30, the second connecting rod 31, the third connecting rod 32, and the fourth connecting rod 33 may rotate counterclockwise from an initial position to a horizontal position, as shown in FIG. 4. In this case, the first clamping member 10 and the second clamping member 20 may be pulled open to positions with a maximum distance.

Then, as shown in FIG. 5, after the clamping device 100 is sleeved onto the object 90, the force applied on the first clamping member 10 and the second clamping member 20 is stopped. In this case, under the action of a restoring force provided by the elastic member 40, the first connecting rod 30 rotates relative to the second clamping member 20, to drive the second connecting rod 31 and the first clamping member 10 to rotate, so that the minimum distance between the first clamping member 10 and the second clamping member 20 is shortened to clamp the object 90. In other words, the restoring force of the elastic member 40 may make the first connecting rod 30, the second connecting rod 31, the third connecting rod 32, and the fourth connecting rod 33 rotate clockwise until the first clamping member 10 and the second clamping member 20 clamp the object 90.

In this way, the clamping device 100 may be mounted and sleeved onto a required position only by pulling open the clamping device 100 outward (that is, pulling the first clamping member 10 and the second clamping member 20 to make the elastic member 40 be pulled open), and after the force applied on the clamping device 100 is stopped, the clamping device 100 may automatically clamp the object 90. This is very convenient and quick in assembling. In addition, if different clamping forces are required, adjustments may also be performed by changing an elastic member 40 with a different spring coefficient. Besides, by respectively disposing connecting rods on two sides of the first clamping member 10 and the second clamping member 20, the two sides may respectively provide clamping functions, to make the clamping force evenly applied on the object 90 and stabilize the clamping.

As described above, in other implementation aspects, it is also allowed that only the first connecting rod 30 and the second connecting rod 31 are disposed, and the third connecting rod 32 and the fourth connecting rod 33 are omitted. In this way, the elastic member 40 may also provide a restoring force to the first connecting rod 30 to drive the first connecting rod 30 to rotate relative to the second clamping member 20, to drive the second connecting rod 31 and the first clamping member 10 to rotate, so that the minimum distance between the first clamping member 10 and the second clamping member 20 is shortened, to move close to each other to clamp the object 90.

Referring to FIG. 1, FIG. 2, and FIG. 5, in this embodiment, a first screw 51 may be further disposed to penetrate the another end of the third connecting rod 32 and be locked on the third side 21, and a second screw 52 may be further disposed to penetrate the another end of the fourth connecting rod 33 and be locked on the fourth side 22. In some embodiments, the first screw 51 and the second screw 52 may be implemented by stepped screws. In this way, before the clamping device 100 being sleeved onto the object 90, the first screw 51 and the second screw 52 may be loosened. In this case, the third connecting rod 32 and the fourth connecting rod 33 may respectively pivot. After the object 90 is clamped by the first clamping member 10 and the second clamping member 20, the first screw 51 and the second screw 52 may be tightened. In this case, one end of the third connecting rod 32 adjacent to the third side 21 and one end of the fourth connecting rod 33 adjacent to the fourth side 22 are clamped and fixed, so that the third connecting rod 32 and the fourth connecting rod 33 cannot rotate again, leading to that other connecting rods are also fixed and cannot rotate. In this way, the first clamping member 10 and the second clamping member 20 are fixed at a clamping position, and may not be away from each other due to an additionally applied external force, which further causes a problem of falling off from the object 90.

As described above, in other implementation aspects, if only the first connecting rod 30 and the second connecting rod 31 are disposed, the first screw 51 may be disposed to penetrate the another end of the first connecting rod 30 and be locked on the third side 21, and the second screw 52 may be disposed to penetrate the another end of the second connecting rod 31 and be locked on the fourth side 22. After the object 90 is clamped by the first clamping member 10 and the second clamping member 20, the first screw 51 and the second screw 52 may be tightened. In this case, one end of the first connecting rod 30 adjacent to the third side 21 and one end of the second connecting rod 31 adjacent to the fourth side 22 are clamped and fixed, such that the first connecting rod 30 and the second connecting rod 31 cannot rotate again. In this way, the first clamping member 10 and the second clamping member 20 may also be fixed at a clamping position, and may not be away from each other due to an additionally applied external force, which further causes a problem of falling off from the object 90.

Referring to FIG. 1 to FIG. 3 again, in this embodiment, the second clamping member 20 may further include a stopper 23 convexly disposed on the third side 21, and the stopper is adjacent to the third connecting rod 32 and is located above the third connecting rod 32. Further, as shown in FIG. 3, the stopper 23 may include an inclined surface. When the first clamping member 10 and the second clamping member 20 are close to each other under the action of the elastic member 40, the third connecting rod 32 may stop at the stopper 23 after rotating clockwise, so that the first clamping member 10 and the second clamping member 20 may stay at the initial position shown in FIG. 1 and FIG. 3, to prevent the connecting rods from rotating excessively to further cause the problem that the elastic member 40 is deformed or falls off.

Further, on a corresponding fourth side 22, a same stopper 23 may also be convexly disposed on the fourth side 22, and the stopper is adjacent to the fourth connecting rod 33 and is located above the fourth connecting rod 33. In this way, the fourth connecting rod 33 is provided to stop at the stopper 23 after rotating clockwise, to make both the left side and the right side of the first clamping member 10 and the second clamping member 20 provide a stopping force simultaneously, so that the force balance of the left side and the right side is more even.

In addition, an anti-rotation protruding portion 321 is convexly disposed on a side surface of the third connecting rod 32 facing the third side 21. The anti-rotation protruding portion 321 may be disposed at a middle position in a length direction of the third connecting rod 32 or may be disposed according to a required position. After the third connecting rod 32 rotates clockwise, the anti-rotation protruding portion 321 may abut against the first clamping member 10, to prevent the third connecting rod 32 from rotating continuously, thereby achieving the same effect as the stopper 23.

Similarly, an anti-rotation protruding portion 331 may also be convexly disposed on a side surface, facing the fourth side 22, of the fourth connecting rod 33 located on the other side, so that the two sides both have corresponding stopping functions.

Then, still referring to FIG. 1 to FIG. 3, in this embodiment, a first fixing member 301 is convexly disposed on a side surface of the first connecting rod 30 facing the third side 21, and a second fixing member 24 is convexly disposed on the third side 21 of the second clamping member 20. One end of the elastic member 40 is fixedly disposed on the second fixing member 24, and the another end is fixedly disposed on the first fixing member 301. In this way, the elastic member 40 is fixedly disposed on an inner surface of the first connecting rod 30, to prevent the elastic member 40 from being damaged to lose the elasticity due to a man-caused or external collision after being operated or assembled.

Further, a groove 211 may be concavely disposed on the third side 21 and located above the first connecting rod 30, and the second fixing member 24 is disposed in the groove 211, so that the elastic member 40 is parallel to the third side 21 after being connected to the first fixing member 301 and the second fixing member 24. In this way, in addition to reducing the overall size, since the elastic member 40 is parallel to the third side 21, when pulling the first clamping member 10 and the second clamping member 20, the elastic member 40 may also suffer a force in a relatively single direction and be stretched. The service life of the elastic member 40 may also be prolonged by reducing the torsion or the force offsetting left or right.

A second fixing member 24 (not shown in the figure) may also be convexly disposed on the corresponding fourth side 22, a third fixing member 311 is convexly disposed on a side surface of the second connecting rod 31 facing the fourth side 22, then one end of another elastic member 40 is fixedly disposed on the second fixing member 24, and the another end is fixedly disposed on the third fixing member 311. In a manner of adding the elastic member 40 on two sides, a situation in which the left side and the right side are stretched when a force is applied may be more even, and the elasticity and the restoring force may also be increased through two parallel elastic members 40.

As can be seen from FIG. 3 and FIG. 4, the second clamping member 20 may further include a limiting portion 25 convexly disposed on the third side 21, the limiting portion 25 is adjacent to the first connecting rod 30 and located below the first connecting rod 30, to limit a rotation angle of the first connecting rod 30. Specifically, when the first clamping member 10 and the second clamping member 20 are pulled open to a position shown in FIG. 4, the first connecting rod 30 may stop rotating due to the limiting portion 25, thereby preventing the first clamping member 10 and the second clamping member 20 from misaligning in another direction due to the continuously applied force, which makes the elastic member 40 overstretched. By using the limiting portion 25, a user may also know that the first clamping member 10 and the second clamping member 20 have been stretched to positions with a maximum distance, so that the user stops applying the force.

Similarly, a limiting portion (not shown in the figure) may also be disposed on the fourth side 22 located on the other side, and the limiting portion is adjacent to the second connecting rod 31 and located below the second connecting rod 31, to provide a same limiting function as the second connecting rod 31, to make the force applied on the two sides relatively balanced.

In addition, the first clamping member 10 may further include an arc-shaped buffer 13 disposed between the first side 11 and the second side 12, and the buffer 13 is located on one side of the first clamping member 10 facing the second clamping member 20. Similarly, the second clamping member 20 may also further include an arc-shaped buffer 26 disposed between the third side 21 and the fourth side 22, and the buffer 26 is located on one side of the second clamping member 20 facing the first clamping member 10. In some embodiments, the buffers 13 and 26 may be a material including an elastic buffering function such as rubber, to provide a better attachment area and an anti-slip force for objects 90 with different diameters, to make the clamping tighter and more stable.

In a further application, the clamping device 100 includes a sensing element 60. The sensing element 60 may be disposed on the first clamping member 10 facing the second clamping member 20, or may be disposed on the second clamping member 20 facing the first clamping member 10. The sensing element 60 is used to sense elements on the object 90 and transmitting a corresponding signal to a host (not shown in the figure). For example, if the object 90 is a common machine warning light on a general machine, the clamping device 100 may be clamped at a green light segment or a red light segment. In this way, when the machine works normally or works abnormally, a signal may be transmitted instantly by the sensing element 60 to a host end for monitoring, so that a human observation error, or a situation in which a plurality of machines cannot be monitored simultaneously due to shortage of manpower may be avoided.

In conclusion, for the clamping device 100 in this embodiment, or a clamping device including only two connecting rods described in other implementation aspects, the clamping device 100 may be sleeved onto a required position only by pulling open the clamping device 100 outward, and after the force applied on the clamping device 100 is stopped, the clamping device 100 may automatically clamp the object 90. This is very convenient and quick in assembling. In addition, if different clamping forces are required, adjustments may also be performed by changing an elastic member 40 with a different spring coefficient. Besides, by respectively disposing connecting rods on two sides of the first clamping member 10 and the second clamping member 20, the two sides may respectively provide clamping functions, to make the clamping force evenly applied on the object 90 and stabilize the clamping.

Although the present disclosure is described with reference to the above embodiments, the embodiments are not intended to limit the present disclosure. A person of ordinary skill in the art may make variations and improvements without departing from the spirit and scope of the present disclosure. Therefore, the protection scope of the present disclosure shall be subject to the appended claims of this specification.

What is claimed is:

1. A clamping device, comprising:
    a first clamping member, comprising a first side and a second side, wherein the first side and the second side are located on two opposite sides;
    a second clamping member, comprising a third side, a fourth side and a limiting portion, wherein the third side and the fourth side are located on two opposite sides, and the limiting portion convexly disposed on the third side;
    a first connecting rod, one end being pivotally disposed on the first side, and another end being pivotally disposed on the third side, wherein the limiting portion is adjacent to the first connecting rod and located below the first connecting rod, to limit a rotation angle of the first connecting rod;
    a second connecting rod, one end being pivotally disposed on the second side, and another end being pivotally disposed on the fourth side; and
    an elastic member, one end being connected to the third side, and another end being connected to the first connecting rod, wherein the elastic member provides a restoring force to make the first connecting rod rotate relative to the second clamping member, to drive the second connecting rod and the first clamping member to rotate, so that a distance between the first clamping member and the second clamping member is shortened to clamp an object.

2. The clamping device according to claim 1, further comprising:
    a third connecting rod, one end being pivotally disposed on the first side, and another end being pivotally disposed on the third side; and
    a fourth connecting rod, one end being pivotally disposed on the second side, and another end being pivotally disposed on the fourth side.

3. The clamping device according to claim 2, further comprising:
    a first screw, penetrating the another end of the third connecting rod and being locked on the third side; and
    a second screw, penetrating the another end of the fourth connecting rod and being locked on the fourth side.

4. The clamping device according to claim 2, wherein the second clamping member further comprises a stopper convexly disposed on the third side, and the stopper is adjacent to the third connecting rod and is located above the third connecting rod, to make the third connecting rod stop at the stopper after rotation, so that the first clamping member and the second clamping member stop at an initial position.

5. The clamping device according to claim 2, wherein an anti-rotation protruding portion is convexly disposed on a side surface of the third connecting rod facing the third side, and when the third connecting rod rotates until the anti-rotation protruding portion stops at the first clamping member, the third connecting rod stops rotating.

6. The clamping device according to claim 1, wherein a first fixing member is convexly disposed on a side surface of the first connecting rod facing the third side, a second fixing member is convexly disposed on the third side of the second clamping member, the one end of the elastic member is fixedly disposed on the second fixing member, and the another end of the elastic member is fixedly disposed on the first fixing member.

7. The clamping device according to claim 6, wherein a groove is concavely disposed on the third side and above the first connecting rod, and the second fixing member is disposed in the groove, so that the elastic member is parallel to the third side.

8. The clamping device according to claim 1, wherein the first clamping member further comprises a buffer disposed between the first side and the second side, and the buffer is located on one side of the first clamping member facing the second clamping member.

9. The clamping device according to claim 1, further comprising a sensing element, disposed on the first clamping member and facing the second clamping member, or disposed on the second clamping member and facing the first clamping member, wherein the sensing element is configured to sense elements on the object and transmitting a corresponding signal to a host.

* * * * *